(12) United States Patent
Kitson

(10) Patent No.: US 7,847,011 B2
(45) Date of Patent: Dec. 7, 2010

(54) INTERMEDIATE SOFTENING POINT RESIN-BASED HOT MELT PSAS

(75) Inventor: Ralph P. Kitson, Jefferson, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/816,173

(22) PCT Filed: Jul. 25, 2006

(86) PCT No.: PCT/US2006/028781

§ 371 (c)(1),
(2), (4) Date: Aug. 14, 2007

(87) PCT Pub. No.: WO2007/019042

PCT Pub. Date: Feb. 15, 2007

(65) Prior Publication Data

US 2008/0262134 A1    Oct. 23, 2008

Related U.S. Application Data

(60) Provisional application No. 60/705,423, filed on Aug. 4, 2005.

(51) Int. Cl.
C08L 53/00 (2006.01)
C08L 23/00 (2006.01)
(52) U.S. Cl. .................... 524/505; 524/274
(58) Field of Classification Search .............. 524/505
See application file for complete search history.

(56) References Cited

U.S. PATENT DOCUMENTS

| 3,577,398 | A | 5/1971 | Pace et al. |
|---|---|---|---|
| 3,692,756 | A | 9/1972 | St. Cyr |
| 4,797,460 | A | 1/1989 | Davis |
| 5,041,492 | A | 8/1991 | Koprowicz et al. |
| 5,412,032 | A | 5/1995 | Hansen et al. |
| 5,428,109 | A | 6/1995 | Kuroiwa et al. |
| 5,532,306 | A | 7/1996 | Kauffman et al. |
| 5,853,874 | A | 12/1998 | Jacob |
| 6,214,935 | B1 * | 4/2001 | Sasaki et al. ............ 525/89 |
| 6,218,457 | B1 * | 4/2001 | Fralich et al. ............ 524/489 |
| 6,340,236 | B1 | 1/2002 | Hisanaga |
| 6,455,168 | B2 | 9/2002 | Kuno et al. |
| 2004/0167258 | A1 | 8/2004 | Drogou et al. |
| 2004/0229000 | A1 | 11/2004 | Khandpur et al. |
| 2005/0075431 | A1 | 4/2005 | Haner et al. |

FOREIGN PATENT DOCUMENTS

| EP | 0 259 697 A2 | 3/1988 |
|---|---|---|
| GB | 1 447 419 A | 8/1976 |
| WO | 00/04108 | 1/2000 |
| WO | 00/78886 | 12/2000 |

OTHER PUBLICATIONS

International Search Report for corresponding PCT/US2006/028781 mailed Nov. 16, 2006.

* cited by examiner

*Primary Examiner*—Ling-Siu Choi
*Assistant Examiner*—Hui Chin

(57) ABSTRACT

A rosin based intermediate softening point (ISPR) tackifier has a ring and ball softening point of from 35 to 60° C. A hot-melt pressure-sensitive adhesive (HMPSA) composition contains an elastomeric component, such as a blend of SIS and SB block copolymers, and a tackifying component comprising one or more rosin based ISPRs having a ring and ball softening point of from 35 to 60° C.

11 Claims, No Drawings

INTERMEDIATE SOFTENING POINT RESIN-BASED HOT MELT PSAS

This application claims priority to provisional patent application Ser. No. 60/705,423 filed Aug. 4, 2005, the content of which is hereby incorporated by reference in its entirety.

FIELD OF THE INVENTION

The present invention is directed to hot melt pressure-sensitive adhesives (PSAs) based on elastomeric components tackified with intermediate softening point resins.

BACKGROUND

Adhesive labels and tapes are well known. In a typical label construction, one or more layers of adhesive are coated on or otherwise applied to a release liner, and then laminated to a facestock, such as paper, polymeric film, or other ink-receptive, flexible material. In a typical tape construction, a polymeric film or woven paper is coated with an adhesive on one surface, which is then wound up upon itself. A release liner is not generally required. Labels are usually die-cut and matrix-stripped before use. In contrast, tapes usually do not require die-cutting and matrix-stripping, and generally need not be ink-receptive.

The adhesives used in both tapes and labels include pressure-sensitive adhesives (PSAs). Both rubber-based and acrylic-based PSAs are known; most contain one or more tackifiers that improve overall adhesion to various substrates. PSAs can be applied to a release liner or facestock from an organic solvent, from an aqueous dispersion, or as a hot melt. Hot melt PSAs (HMPSAs) are highly desirable, as the absence of solvent or water lowers the energy required to form the adhesive layer and reduces the environmental problems associated with solvent-borne adhesives. However, most HMPSAs are somewhat volatile and contain volatile organic compounds (VOCs).

A typical rubber-based HMPSA composition contains one or more natural or synthetic elastomers, tackified with a petroleum resin and/or other ingredients, such as plasticizers, that improve the tack of the adhesive. Elastomeric block copolymers are widely used as the polymeric components in HMPSAs.

Natural and synthetic elastomers containing polybutadiene segments and polyisoprene segments are not generally miscible with each other. It is known in the art, however, to mix immiscible elastomeric polymers based on polybutadiene and polyisoprene. Homopolymers are generally more difficult to employ then styrenic block copolymers. With styrenic block copolymers, while the midblocks are immiscible, the end blocks of polystyrene form one common domain, thus stabilizing the mixture and eliminating some or all of the problematic effects of incompatibility, such as separation of the elastomeric phases over time.

One problem with PSAs based on tackified elastomeric blends is diffusion and migration of tackifiers and other species into the facestock. As a result, the facestock may become stained over time, and the construction may lose some adhesion. Although an intermediate barrier layer can be positioned between the facestock and the adhesive, such an approach complicates the manufacturing process and increases the cost of the construction.

During label manufacture, a laminate of a facestock, PSA layer and a release liner is passed through apparatus that converts the laminate into commercially useful labels and label stock. The processes involved in the converting operation include printing, die-cutting and matrix-stripping to leave labels on a release liner, butt-cutting of labels to the release liner, marginal hole punching, perforating, fan folding, guillotining and the like. Die-cutting involves cutting of the laminate to the surface of the release liner. Hole punching, perforating and guillotining involve cutting cleanly through the label laminate.

The cost of converting a laminate into a finished product is a function of the speed and efficiency at which the various processing operations occur. While the nature of all layers of the laminate can impact the ease and cost of convertibility, the adhesive layer typically has been the greatest limiting factor in ease of convertibility. This is due to the viscoelastic nature of the adhesive, which hampers precise and clean penetration of a die in die-cutting operations and promotes adherence to die-cutting blades and the like in cutting operations. Stringiness of the adhesive also impacts matrix-stripping operations, which follow die-cutting operations.

Achieving good convertibility does not, by necessity, coincide with achieving excellent adhesive performance. Adhesives must be formulated to fit specific performance requirements, including sufficient shear, peel adhesion, tack or quick stick, at various temperatures. A good, general purpose adhesive may exhibit poor convertibility simply because the adhesive is difficult to cleanly cut. Such an adhesive may stick to a die or cutting blade during converting operations. In general, the softer the elastomer(s) and resin(s) used in the composition, the more readily the adhesive will adhere to a surface. However, if the composition is too soft and tacky, its cohesive strength (shear strength) will be low, and the composition may split or shear easily under stress, or ooze under pressure. A useful HMPSA would have both high tack and high cohesive strength and, in addition, would have good flow characteristics if it is to be used in the bulk state, so that it can be coated or otherwise applied to a facestock or, coated on a release liner and laminated to a facestock.

A variety of petroleum resins and other compounds are used as PSA tackifiers. Such petroleum resin tackifiers are obtained by polymerization of a stream of aliphatic petroleum derivatives in the form of dienes and monoolefins containing five or six carbon atoms. The resulting petroleum resins typically are normally liquid at room temperature or normally solid at room temperature, and generally have low or high softening points, respectively.

Intermediate softening point resins (ISPR) are typically petroleum derived hydrocarbon resins that are semi-solid materials at room temperature. Although they appear solid, in fact, they are highly viscous materials and will flow over time. Such resins have softening points ranging from about 35° C. to 60° C.

Because of the increased cost of petroleum based products, it would be advantageous to eliminate or reduce the dependence on petroleum based products. With regard to petroleum based tackifiers, it would be desirable to produce a rosin based tackifier, and in particular a rosin based intermediate softening point resin.

SUMMARY

In one aspect, the present invention is directed to an intermediate softening point resin (ISPR) comprising: about 40% to about 80% by weight of a main component comprising at least one rosin based resin having a ring and ball softening point of about 85 to about 125° C.; and about 20% to about 60% by weight of a modifier component comprising at least one rosin based resin having a low softening point, such that when combined with the main component, the overall ring and ball softening point of the ISPR is within the range of about 35 to about 60° C.

According to the another aspect of the present invention, hot melt pressure-sensitive adhesive (HMPSA) compositions and label constructions are provided. The adhesive compositions are characterized by reduced volatility, improved overall adhesive performance, and less bleed and staining tendencies, especially into paper facestocks. Label constructions made with the new HMPSAs can be applied to a variety of substrates over a wide range of application temperatures, and are ideally suited for general purpose permanent (GPP) label applications, including industrial labeling of bottles and other articles.

In one embodiment of the invention, the HMPSA comprises one or more elastomers and an intermediate softening point resin (ISPR) derived from rosin and having a ring and ball softening point of from about 35 to about 60° C.

In another embodiment of the invention, the HTMPSA composition comprises a blend of at least two elastomers, including a first styrenic elastomer selected from the group consisting of SIS block copolymers, SI block copolymers, multiarmed $(SI)_x$ block copolymers where x has a value of three or more, radial block copolymers comprising an SI backbone and I and/or SI arms, and mixtures thereof, and a second styrenic elastomer selected from the group consisting of SBS block copolymers, SB block copolymers, multiarmed $(SB)_x$ block copolymers where x has a value of three or more radial block copolymers comprising an SEBS backbone and I and/or SI arms, and mixtures thereof; and a tackifying component comprising at least one ISPR as described above. In some embodiments, the composition further comprises a small amount (up to about 10% by weight), of one or more normally solid tackifiers or normally liquid tackifiers. Small amounts of antioxidants, fillers, pigments, and other additives can be included in the formulation.

The invention also provides PSA label stock and label constructions characterized by low volatility, low facestock stain and bleed, good convertibility, and good adhesion to a variety of substrates over a wide range of application temperatures. In one embodiment, the PSA label construction comprises a flexible facestock and a HMPSA composition as described above, coated on or otherwise applied to the facestock.

DETAILED DESCRIPTION

In accordance with the present invention, HMPSAs are provided and comprise an elastomeric component tackified with a rosin based intermediate softening point resin (ISPR).

The elastomer(s) may be tackified with a tackifying component or system that comprises at least one rosin based ISPR. ISPRs are hydrocarbon resins that are semi-solid materials at room temperature. Although they appear solid, in fact, they are highly viscous materials and will flow over time. Such resins have softening points ranging from about 35° C. to about 60° C., or within the range of about 50 to about 60° C.

In one embodiment of the invention, the intermediate softening point resin (ISPR) comprises (a) about 40% to about 80% by weight of a main component comprising at least one rosin based resin having a ring and ball softening point of about 85 to about 125° C.; and (b) about 20% to about 60% by weight of a modifier component comprising at least one rosin based resin having a low softening point, such that when combined with the main component, the overall ring and ball softening point of the ISPR is within the range of about 35 to about 60° C.

The main component comprises a rosin derived resin that is highly compatible with the isoprene and/or butadiene mid-blocks of the SIS and SBS block copolymers typically used in hot melt adhesives. In one embodiment, the main component comprises a pentaerythritol ester of rosin derived from gum, tall oil or wood and has a ring and ball softening point of about 85 to about 125° C. In one embodiment, the main component comprises a glycol ester of rosin. In one embodiment, the main component comprises a polyterpene resin derived from pine or citrus, or a mixture thereof, and has a ring and ball softening point of about 85 to about 125° C.

The modifier component comprises at least one resin that increases the tackifier compatibility with the isoprene and/or butadiene polymer mid-blocks of the SIS and SBS copolymers of the adhesive. The modifier component may also increase the compatibility with random or tapered polymers. The modifier component modifies the resin softening point so that the softening point of the ISPR is within the range of about 35 to about 60° C. This component is included to improve tack, peel strength and low temperature performance of the adhesive without compromising the convertibility of the adhesive article. In one embodiment, the modifier comprises a polyterpene resin derived from pine or citrus, or a blend of both, and has a low molecular weight to lower the softening point and/or provide improved tack. In one embodiment, the modifier comprises a terpene phenolic resin or styrenated terpene resin derived from pine or citrus or a blend of both, and may provide improved color, odor, SB compatibility and/or specific adhesion. In one embodiment, the modifier comprises a glycerol ester or ester derived from another low molecular weight alcohol with a very low softening point. In one embodiment, wherein the main component comprises a polyterpene resin, the modifier may comprise a pentaerythritol ester. The pine rosin acids from which the esters may be derived include abietic acid, neoabietic acid, pimaric acid, dehydroabietic acid, palustric acid, and isopimaric acid. The modifier component may comprise combinations of two or more of the modifiers identified herein.

At the low deformation frequencies encountered in bonding processes (i.e, application of an adhesive construction to a substrate), ISPRs flow, thereby imparting good wettability to the adhesive system. But unlike conventional liquid resins or plasticizing oils, ISPRs behave more like solid resins at high deformation frequencies, increasing the storage modulus of the adhesive system and enhancing die-cutting and converting performance. ISPRs appear to compatibilize the two immiscible elastomers, which then tend to exhibit a single glass transition temperature peak in a dynamic mechanical spectrum (DMS). However, in some embodiments, two glass transition temperatures may be observed.

Advantageously, adhesive formulations incorporating ISPRs have lower percent volatiles than those formulated with a liquid resin and plasticizing oil, and can be applied over a broader range of temperatures than similar systems formulated with normally liquid and/or normally solid resins and plasticizing oils. In addition, heat-aging studies indicate that the ISPR-based HMPSAs have less bleed and staining tendencies than HMPSAs formulated with liquid tackifiers and plasticizers.

The elastomers used in the present invention are natural or synthetic elastomeric polymers, including, for example, polybutadiene, polyisoprene (both natural rubber and synthetic polymers); and, more particularly, AB, ABA, and "multiarmed" $(AB)_x$ block copolymers, where for example, A is a polymerized segment or "block" of at least one monoalkenylarene, such as styrene, alpha-methyl styrene, vinyl toluene and the like, B is an elastomeric, conjugated polybutadiene or polyisoprene block, and x has a value of three or more. Other radial block copolymers (described below) may also be employed.

In one embodiment of the invention, the elastomeric component comprises an SIS block copolymer, or a mixture of SIS and SI block copolymers, where "S" denotes a polymerized segment or "block" of styrene monomers and "I" denotes a polymerized segment or "block" of isoprene monomers. More generally, the elastomeric component comprises a first styrenic elastomer, for example SIS block copolymers, SI block copolymers, multiarmed $(SI)_x$ block copolymers where x is 3 or more, radial block copolymers comprising an SI backbone and I and/or SI arms, and mixtures of such copolymers. The elastomeric component may further comprise a second styrenic elastomer, for example SBS block copolymers, SB block copolymers, multiarmed $(SB)_x$ block copolymers where x is 3 or more, radial block copolymers comprising an SEBS backbone and I and/or SI arms (where "E" and "B" are, respectively, polymerized segments of ethylene and butylene), and mixtures thereof. Other nonlimiting examples of elastomers are polybutadiene and polyisoprene. Particularly useful are mixtures of SIS and SI block copolymers, or mixtures of SIS, SI and SB block copolymers.

Monoalkenylarene block copolymers can be prepared using anionic polymerization techniques that are well known in the art. Commercially available isoprene-based elastomers useful in the practice of the present invention include linear SIS and/or SI block copolymers, for example, Quintac 3433 and Quintac 3421, available from Nippon Zeon Company, Ltd. (U.S. sales office—Louisville, Ky.); Vector DPX 559, Vector 4111 and Vector 4113, available from Dexco, a partnership of Exxon Chemical Co. (Houston, Tex.) and Dow Chemical Co. (Midland Mich.); and Kraton® rubbers, such as Kraton 604x, Kraton D-1117, Kraton D-1107 and Kraton D-1113, available from Shell Chemical Co. (Houston, Tex.). Kraton D-1107 is a predominantly SIS elastomer containing about 15% by weight SI block copolymers. Kraton 604x is an SIS elastomer containing about 55% SI block copolymers. Kraton D-1320X is an example of a commercially available $(SI)_xI_y$ multiarmed block copolymer in which some of the arms are polyisoprene blocks. Commercially available butadiene-based elastomers include SBS and/or SB rubbers, for example Kraton D-1101, D-1102 and D-1118x, from Shell Chemical Co.; and Solprene 1205, a SB block copolymer available from Housemex, Inc. (Houston, Tex.). Other examples of commercially available block copolymers useful in the practice of the present invention include Kraton TKG-101 (sometimes called "Tacky G"), a radial block copolymer having an SEBS backbone and I and/or SI arms. Kraton G elastomers such as Kraton G-1657, however, are not generally appropriate as they do not yield a useful PSA when mixed with an ISPR.

In general, the elastomers comprise about 20 to about 50%, or about 25 to about 40%, by weight of the total HMPSA composition, with the balance of the composition (about 50 to 80%, or about 60 to about 75% by weight) primarily consisting of tackifying resins. Particularly useful HMPSA compositions contain a blend of (a) SB block copolymers and (b) SIS block copolymers (or a mixture of SIS and SI block copolymers), with a weight ratio of butadiene-based elastomer(s) to isoprene-based elastomers of from about 0.5:1 to about 2:1. At weight ratios above 2:1, low temperature adhesive performance suffers. In one embodiment of the invention, such a composition comprises from about 10-20% by weight SB block copolymers and 10-25% by weight SIS (or SIS/SI) block copolymers, with the balance comprising a tackifying component and, optionally, a minor amount of antioxidant. Fillers, such as calcium carbonate, also can be added to the formulation.

Although an ISPR can be used in lieu of a normally liquid resin and a plasticizer, or a blend of normally liquid and normally solid resins, in some embodiments of the invention it is advantageous to include a small amount of a normally solid or normally liquid tackifier in order to adjust the glass transition temperature of the HMPSA. Normally solid tackifiers are those which, when prilled, tend to remain prilled, even under hot and humid conditions. They tend to have softening points greater than about 80° C., and are solid at or near room temperature (20-25° C.). In contrast, normally liquid tackifiers are liquids at room temperature, with softening points less than about 20° C. If normally solid and/or liquid tackifiers are included in the formulation, they are present in an amount of no more than about 10% by weight respectively, based on the total weight of elastomers and tackifiers.

Nonlimiting examples of normally solid and normally liquid tackifiers include the Wingtack® family of resins sold by the Chemical Division of Goodyear Tire and Rubber Company (Akron, Ohio). Wingtack® resins have a numerical designation that corresponds to the softening point of the resin, i.e., Wingtack® 95 is normally a solid at room temperature, with a softening point of about 95° C., and Wingtack® 10 is normally a liquid at room temperature, with a softening point of about 10° C. Other normally solid tackifiers include Escorez 1304, Escorez 1310-LC, and Escorez 2596, manufactured by Exxon Chemical Co. (Houston, Tex.), and Piccotac 95, manufactured by Hercules Inc. (Wilmington, Del.). Solid and liquid tackifiers can be prepared by polymerization of a stream of aliphatic petroleum derivatives in the form of dienes and monoolefins, in accordance with the teachings of U.S. Pat. Nos. 3,577,398 and 3,692,756.

In some embodiments the HMPSA composition may contain additional tackifiers, such as rosins, rosin esters, and polyterpenes, and/or a plasticizer, such as Shellflex 371 (manufactured by Shell Chemical Co.) and Kaydol Mineral Oil (manufactured by Witco Chemical Corp., Houston, Tex.). The additional tackifiers and/or plasticizers can be added to the formulation to adjust the Tg, viscosity, or other properties of the HMPSA. If plastisizers are included, they are present in an amount of no more than about 7% by weight.

In addition to the elastomers and tackifiers, the HMPSA compositions may contain a small amount (e.g., about 5 to 8% by weight, based on the weight of all components) of one or more additives or fillers. Nonlimiting examples of such components include antioxidants, such as Irganox 565 and Irgafos 168, both available from the Ciba Additives Division of Ciba-Geigy Corp. (Terrytown, N.Y.); calcium carbonate; and pigments. Antioxidants inhibit oxidative degradation of the adhesive. Calcium carbonate improves the cuttability of the resulting label construction.

The HMPSA compositions may be prepared in a conventional manner by blending together elastomers, tackifier(s), and other components in a batch or semi-batch mixer, or in a screw extruder, at elevated temperature, and optionally in an inert atmosphere. Laboratory scale compounding may be conveniently carried out in a sigma-blade mixer, while commercial scale production may be more efficient using a twin-screw extruder, as described in Adhesives Sealants & Industry, June/July 1998, at pages 44-51, incorporated by reference herein.

HMPSAs prepared in accordance with the invention are useful in preparing improved adhesive articles, including label stock, label constructions, and tape constructions. To that end, an HMPSA is coated on or otherwise applied to a facestock or coated on a release liner (such as a siliconized Kraft paper liner, well known in the art) and then laminated to a facestock. The construction can be slit, die-cut, matrix-stripped, and/or converted in other ways. The release liner protects the HMPSA prior to application to a substrate.

A wide variety of flexible materials can be used as facestocks, including paper, cardboard and polymeric film materials, such as polyolefins (e.g., polyethylene, polypropylene, ethylene-propylene copolymers, etc.). An unexpected advantage of the invention is the ability to use relatively low basis weight paper facestocks (i.e., 50 lb/r) and still achieve sustainable high speed converting (i.e., die-cutting and matrix-stripping). In contrast, most general purpose permanent labels use higher basis weight (e.g., 60 lb/r) facestocks in order to improve high-speed converting operations.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An intermediate softening point resin (ISPR) comprising:
    about 40% to about 80% by weight of a main component comprising at least one rosin based resin having a ring and ball softening point of about 85 to about 125° C.; and
    about 20% to about 60% by weight of a modifier component comprising at least one rosin based resin having a low softening point, such that when combined with the main component, the overall ring and ball softening point of the ISPR is within the range of about 35 to about 60° C.

2. The ISPR of claim 1 wherein the main component comprises at least one resin selected from pentaerythritol ester of rosin, or glycol ester of rosin, or polyterpene resin, or mixtures thereof.

3. The ISPR of claim 1 wherein the modifier component comprised at least on resin selected from a polyterpene, a terpene phenolic, a styrenated terpene, or a glycerol ester, or mixtures of two or more thereof.

4. A rosin based intermediate softening point resin (ISPR) having a ring and ball softening point within the range of about 35 to about 60° C.

5. A hot melt pressure-sensitive adhesive (HMPSA) composition, comprising:
    (a) one or more styrene-butadiene (SB) block copolymers;
    (b) one or more styrene-isoprene-styrene (SIS) block copolymers, or a mixture of SIS and styrene-isoprene (SI) block copolymers; and
    (c) a tackifying component comprising a rosin derived resin having a ring and ball softening point of from about 35 to 60° C.

6. The HMPSA composition of claim 5, wherein (a) and (b) together comprise about 20 to 50% by weight of the HMPSA composition.

7. The HMPSA composition of claim 5, wherein (a) and (b) together comprise about 25 to 40% by weight of the HMPSA composition.

8. The HMPSA composition of claim 5, wherein the tackifying component comprises about 50 to 80% by weight of the composition.

9. The HMPSA composition of claim 5, wherein the tackifying component comprises 60 to 75% by weight of the HMPSA composition.

10. The HMPSA composition of claim 5, further comprising a positive amount up to 7% by weight of a plasticizer.

11. An adhesive article, comprising:
    a facestock; and
    a HMPSA composition coated on or laminated to the facestock, the HMPSA composition comprising (a) one or more SB block copolymers, (b) one or more SI and/or SIS block copolymers, and (c) a tackifying component comprising a rosin derived resin having a ring and ball softening point of from 35 to 60° C.

* * * * *